April 17, 1962 C. A. PETHYBRIDGE ET AL Re. 25,158

THREADING ATTACHMENT WITH LOST MOTION TOOL SPINDLE MEANS FOR TURRET TYPE LATHE

Original Filed Sept. 29, 1954 3 Sheets-Sheet 1

INVENTORS
CHARLES A. PETHYBRIDGE
CLARENCE D. PULSIFER, deceased
MARGUERITE B. PULSIFER, executrix
BY Roy C. Hogwood
ATTORNEY April 17, 1962 C. A. PETHYBRIDGE ET AL Re. 25,158

THREADING ATTACHMENT WITH LOST MOTION TOOL SPINDLE MEANS FOR TURRET TYPE LATHE

Original Filed Sept. 29, 1954 3 Sheets-Sheet 2

INVENTORS
CHARLES A. PETHYBRIDGE
CLARENCE D. PULSIFER, deceased
MARGUERITE B. PULSIFER, executrix
BY Roy C. Hargood
ATTORNEY April 17, 1962 C. A. PETHYBRIDGE ET AL Re. 25,158

THREADING ATTACHMENT WITH LOST MOTION TOOL SPINDLE MEANS FOR TURRET TYPE LATHE

Original Filed Sept. 29, 1954 3 Sheets-Sheet 3

INVENTORS
CHARLES A. PETHYBRIDGE
CLARENCE D. PULSIFER, deceased
MARGUERITE B. PULSIFER, executrix
BY Roy C. Hopgood
ATTORNEY United States Patent Office Re. 25,158
Reissued Apr. 17, 1962

25,158

THREADING ATTACHMENT WITH LOST MOTION TOOL SPINDLE MEANS FOR TURRET TYPE LATHE

Charles A. Pethybridge, New Britain, Conn., and Clarence D. Pulsifer, deceased, late of Farmington, Conn., by Marguerite B. Pulsifer, executrix, Farmington, Conn.; said Charles A. Pethybridge and Clarence D. Pulsifer assignors to The New Britain Machine Company, New Britain, Conn., a corporation of Connecticut Original No. 2,923,015, dated Feb. 2, 1960, Ser. No. 459,118, Sept. 29, 1954. Application for reissue May 25, 1961, Ser. No. 115,855

12 Claims. (Cl. 10—89)

Matter enclosed in heavy brackets [ ] appears in the original patent but forms no part of this reissue specification; matter printed in italics indicates the additions made by reissue.

Our invention relates to threading means for a machine tool, and in particular to automatically operated threading mechanism applicable to a turret lathe as of the type described in Montgomery et al., U.S. Patent No. 2,680,281.

It is an object of the invention to provide improved means of the character indicated.

It is another object to provide an automatic threading attachment for a turret lathe, said attachment being of such basic compactness and versatility either that it may be applied at a selected one of several stations on the turret or that it may be applied in multiple at a corresponding plurality of such stations at any one time, thus enabling different threading operations to take place on the same piece of work at different turret stations.

It is an object to meet the above objects with mechanism inherently applicable to performing operations with self-opening dies, with collapsing right-hand or left-hand taps, and with sensitive or releasing-type tap and die holders, in addition to providing reversing threading for taps and dies of the non-opening or non-collapsing type.

It is a further object to provide in conjunction with such mechanism suitable frame-based tripping means at the working station and effective to make the threading spindle and rotating tool carried thereby at one station operative in accordance with a first desired cycle while at the same time permitting a different threading tool carried at a different turret station to function with a different cycle.

It is a specific object to provide an improved threading spindle for devices of the character indicated.

Other objects and various further features of novelty and invention will be pointed out or will occur to those skilled in the art from a reading of the following specification in conjunction with the accompanying drawings. In said drawings, which show, for illustrative purposes only, a preferred form of the invention:

Briefly stated, our invention contemplates a novel employment of threading means in a turret lathe. The threading spindle is continuously driven and is carried at one station of the turret, and it is so devised that it may be provided in multiple at each of a variety of turret stations. The arrangement is such that no special provision is necessary for feeding the threading tool, in that the dwell on the turret feed cam is utilized to provide a substantial period during which threading takes place. For most applications and for simpler set-ups, it is convenient to rely substantially only on the dwell period for accomplishment of threading functions, but for unusually long threads of relatively short pitch, provision is made for starting threading during the rise of the main cam and, therefore, prior to attainment of the dwell. The threading spindle and threading-tool holder are keyed to each other with substantial axial lost motion so as to permit the chasers to do all the threading feed, and the engagement of the threading-tool holder with the threading spindle is characterized by resiliently loaded follow-up clearance to allow for variation in tool take up on the work from piece to successive piece. Provision is made for a wide range of adjustment of the follow-up clearance, and independent provision is made for wide range of adjustment of the resilient loading, whereby starting pressure may be adjustably selected.

Figure 1:
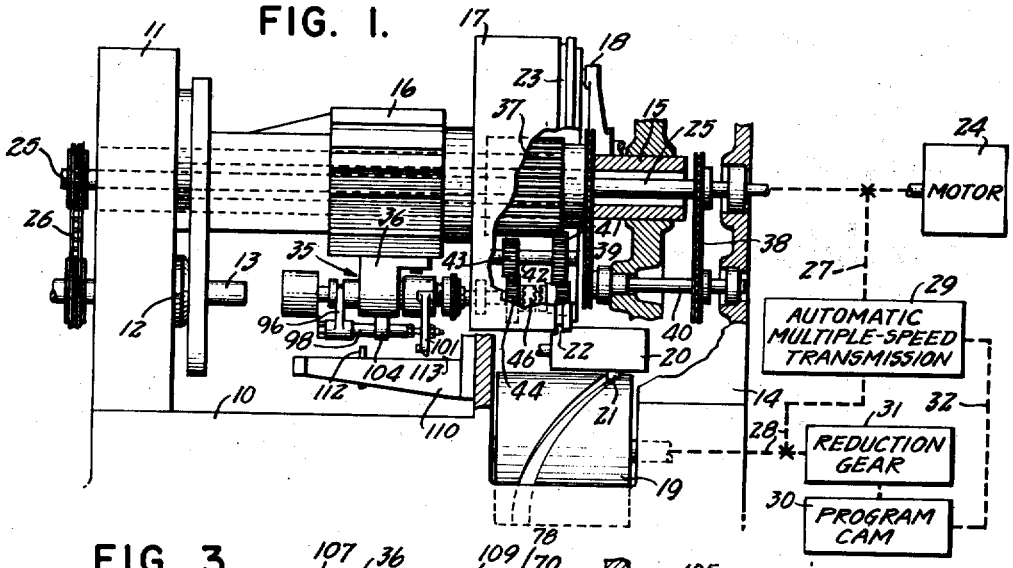
FIG. 1 is a simplified view of a machine incorporating features of the invention, the view being in side elevation and partly broken away to reveal internal parts, some of which are shown in longitudinal vertical section.

Referring to FIG. 1 of the drawings, our invention is shown in application to a turret lathe of the type described in greater detail in said Montgomery et al. patent. Said lathe may thus comprise a bed 10 with an outboard pedestal 11 in which a work-rotating spindle 12 is journalled. The spindle 12 will be understood to include means, such as a collet (not shown) for supporting work such as bar stock 13, projecting to receive a threading operation. At the other end of the machine, the main works may be contained in power case 14, and a turret stem 15 may be firmly based both in the power case 14 and in the outboard pedestal 11.

The turret 16 is axially slidable on the stem 15 on an axis offset from but parallel to the spindle axis. The turret 16 may include a plurality of working stations suitably grooved or otherwise formed to mount tools for operation on the work 13 at each of a plurality of successive working stations. The turret 16 is shown to include at the rear end thereof a drum 17, which in the retracted position may be substantially fully contained within the power case 14. Indexing is accomplished by Geneva means including an arm 18 engageable with a suitably formed index plate carried on the back end of the drum 17. The arm 18 rotates in essentially a single radial plane and is not longitudinally reciprocated with feed of the turret 16 and associated drum 17, but the drive to the arm 18 is so synchronized with the feed cycle for the drum and turret as to assure unfailing register of the indexing parts when the turret has accomplished a feed cycle and is to be indexed to the next working station, all as described in detail in said patent.

Feed for the turret may be derived from a main cam 19 journalled in the frame and driving a turret crosshead 20 intermediate the cam 19 and the drum 17. A follower roll 21 on the turret crosshead 20 rides the cam groove and feed thrusts are imparted to the turret drum 17 by projecting means 22 on the feed slide 20 and riding a peripheral groove 23 at the rear end of the turret drum.

Drive to all rotating parts may be derived from a single motor 24 and imparted to the spindle 12 by way of a shaft 25 within the stem 15; sprocket means 26 is shown nnecting the shaft 25 to the spindle 12. The dashed es 27—28 will be understood to suggest further direct echanical connection of the motor 24 to the feed cam , and at 29 automatic multiple-speed transmission means provided to assure a correct speed for the feed cam; e transmission means 29 may be of the type disclosed in tent No. 2,698,545, dated January 4, 1955, in the name Charles A. Pethybridge. In order that the machine ay be self-cycling throughout a full automatic program, itable program-cam means 30 may be driven through luction-gear means 31 (representing such subdivision rotation of cam 19 as corresponds to the number of ret stations), thereby determining a full program cycle, cluding feed cycles at all working positions of the turret . The dashed line 32 suggests automatic control (by e program cam 30) of speed selection in the transmis- on means 29, all as described in greater detail in the orementioned patents.

In accordance with the invention, a complete self- ntained automatic threading mechanism is bodily car- d by the turret means 16—17 within such confined space to permit application of a similar threading mechanism the next adjacent station of the turret 16. Essentially, e spindle parts 35 are carried at a forward location and e supported by a base member 36, suitably anchored to e turret 16, while the drive parts are carried by and ntained within the drum 17.

Basic drive for threading attachments regardless of tur- station is available from elongated gear means 37 thin the turret drum 17 but axially fixed so as not to be ciprocated with feed of the turret. The gear 37 is shown nnected to the drive shaft 25 by way of first and second rocket drives 38—39, via a jack shaft 40. The gear ives carried by the turret include a take-off gear 41 con- tually meshing with the drive gear 37 and, in FIGS. 1 d 2, shown at the back end of the gear 37 because the rts are illustrated in retracted position. As better seen FIG. 2, the gear 41 is mounted on a jack shaft 42 and, rough change gears 43—44, directly drives the spindle at a first speed. Gear 41 also meshes with a second ar 45 to determine a second speed on the spindle axis, d clutch means 46 between the two gears 44—45 serves select whether the slower spindle speed shall be avail- le from gear 44 or the faster spindle speed shall be ailable from gear 45. If the gear ratios to gears 44—45 e selected to produce speeds respectively above and be- w the drive speed for spindle 12, then a shifting of clutch may determine the proper directions of relative mo- n for threading-on or threading-off of tool means car- d by the spindle 35, as will be understood.

For purposes which will later be made clear, the clutch ifter 46 is preferably normally in engagement with one the drives and is poised for automatic tripping out such engagement and into engagement with the other ive. In the form shown (FIG. 2), the shifter 46 is a eve riding a drive spindle or tube 47 on which both ive gears 44—45 are freely rotatable. The sleeve 46 keyed to the drive tube 47 by means of a pin 48 extend- g diametrically across the sleeve 46 and driving opposed ngitudinal slots of limited axial length in the tube 47. og teeth at opposite ends of the clutch 46 are selectively gageable with mating dog teeth on the gears 44—45 (or mounting means therefor) in order to impart selected ive speeds to the tube or spindle 47. Relatively strong mpression spring means 49 is continuously preloaded shift clutch means 46 from the position shown, into gagement with gear 45, and latch means 50, to be de- ribed in greater detail, hold the clutch in engagement th gear 44. A rod 51 connects the latch means 50 with e clutch 46, and a relatively light compression spring 52 shown urging clutch pin 48 (and therefore clutch 46) to engagement with gear 44, as permitted by limited ial lost motion between the clutch pin 48 and the slot rough which it engages rod 51. A retaining pin 54 car- d by the drive spindle 47 holds the spring 49 preloaded against the forward end of the latched rod 51, in readiness to shift clutch means 46 out of engagement with gear 44 and into engagement with gear 45 upon release of latch 50, as will later be more clear.

As explained in general terms above, our threading mechanism requires no special feeds beyond the turret feed induced by the cam 19, and all or a substantial part of the threading operation may be achieved during the dwell of the cam 19, reliance being made on the chasers in the tap or die head to determine the threading feed on the work. This type of operation contemplates that the feed imparted by the cam 19 shall only be used to start the threading cut on the work and, for this purpose, we incorporate in the threading-spindle mechanism a resiliently loaded follow-up clearance, with provision for not only adjusting the longitudinal magnitude of this clearance, but also for separately adjusting the extent of loading for any given follow-up clearance; such loading is usually referred to as starting pressure.

Figure 3:
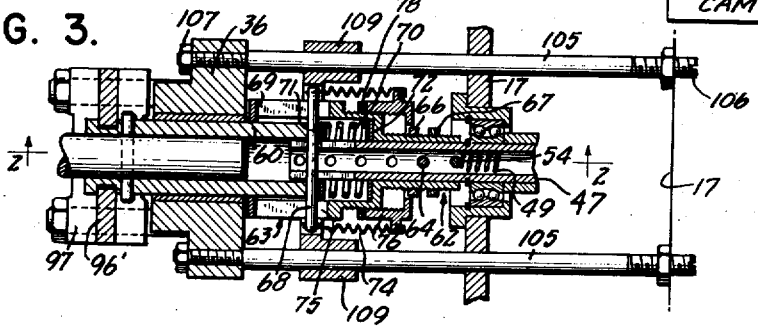
FIG. 3 is an enlarged fragmentary view of a part of the spindle of FIG. 2, but shown in the horizontal sectional plane 3—3 of FIG. 2, the section of FIG. 2 being designated in FIG. 3 as in the plane 2—2 of FIG. 3.
Figure 2:
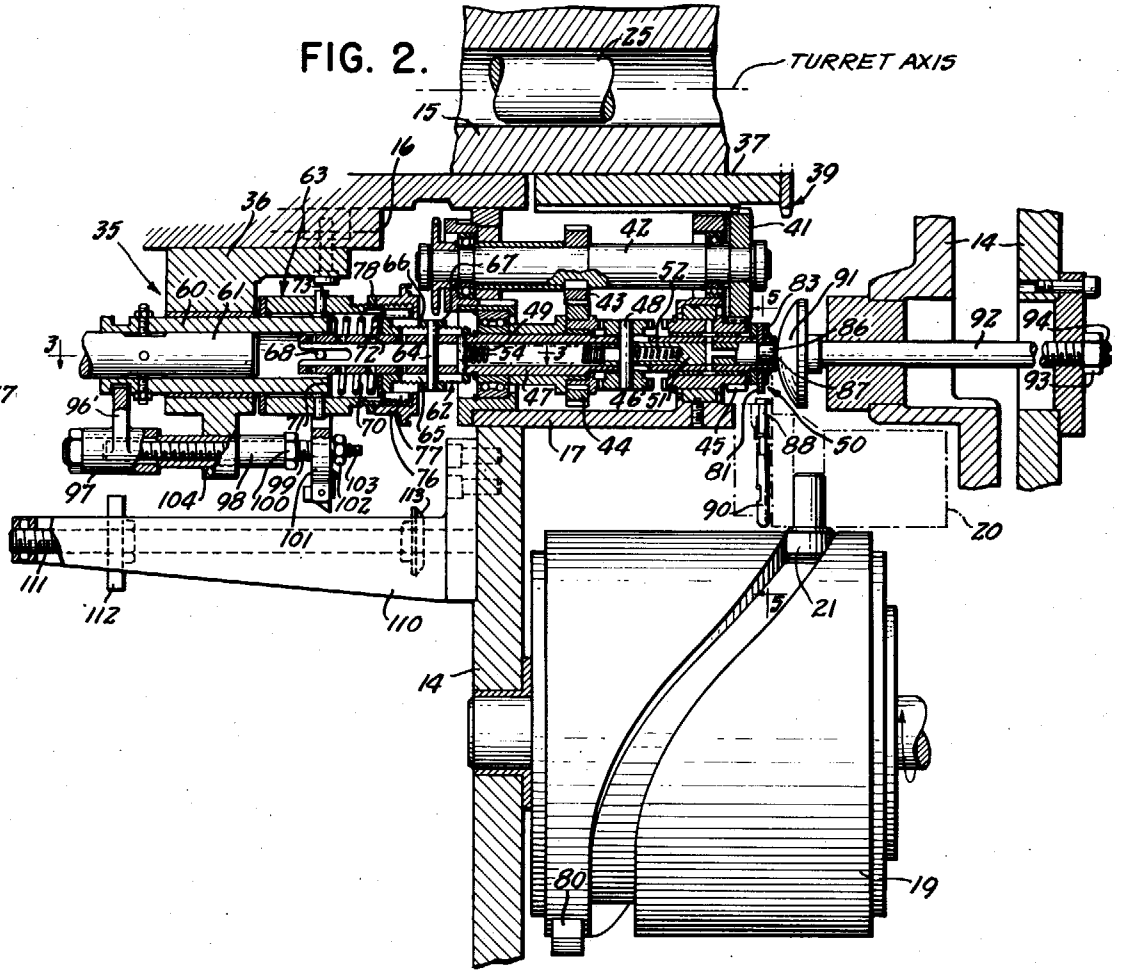
FIG. 2 is an enlarged vertical sectional view through the turret axis and through the axis of a threading spindle at the working station in the machine of FIG. 1, the set-up being illustrative of automatic reversing-threading operation.

The construction of the threading spindle can best be understood by reference to FIGS. 2 and 3 wherein the spindle tube 60 is seen to be journalled in suitable bearing means in the support 36 and to incorporate means for reception and securing of the shank 61 of a tool (or of a releasing-type tap or die holder); the tool and the tool holder or spindle tube 60 may thus be understood as threading-tool means. In order to connect the spindle tube 60 with the drive tube 47, we provide novel adjustable connecting means in the form of a first sleeve portion 62 (longitudinally positionable on the drive tube 47) and a second sleeve portion 63 (longitudinally slidably related to the threading spindle 60).

The rear sleeve portion 62 is preferably firmly referenced to the drive tube 47, and we show means whereby this reference may be adjustably selected. In the form shown, and depending upon set-up conditions, pin means 64 is carried in one of a plurality of axially spaced diametrically opposed holes and projects radially outwardly through elongated slots 65 in the sleeve portion 62. The outer part of sleeve portion 62 is preferably threaded, and clamp nuts 66—67 are secured against opposite sides of the projecting ends of pin 64 in order to achieve the desired longitudinal reference to the drive tube 47. The connection between the other sleeve portion 63 and the spindle tube 60 is preferably characterized by lost motion, as determined by a diametrically extending pin 68 carried by the spindle tube 60 and slidable in elongated slots 69 in the sleeve portion 63. The extent of this lost motion is preferably at least adequate to accommodate the maximum threaded advance ever to be achieved on work during the dwell of the feed cam 19, plus a slight allowance for follow-up clearance. For feeds of greater extent, threading must be initiated during the feed rise of cam 19 and therefore prior to occurrence of the dwell.

In order to establish a resiliently loaded follow-up clearance, we utilize a single relatively stiff spring 70, shown compressed between washers 71—72 riding the spindle tube 60 and the sleeve member 62—63, respectively. Abutment means, such as pins 73 carried by the sleeve portion 63, are poised to intercept the washer 71, thereby determining a limit of expansion for the spring 70. External spring means 74 resiliently load the spindle tube 60 toward the retracted limit of lost motion and, therefore, against the washer 71; thus, with the washer 71 compressed by spring 70 against abutment means 73, the resiliently loaded limit of lost motion is determined. The extent to which lost motion permits spindle tube 60 to be driven further back (in further compression of the spring 70) is the extent of the follow-up clearance and may be visually appreciated by the axial extent of the space 75 in FIG. 3.

It will be seen that, inasmuch as the abutment pins 73 are carried by the connecting member 62—63, and since the nuts 66—67 adjustably position said member 62—63 relatively to the drive spindle 47, said nuts 66—67 (together with pin 64) constitute the means whereby the follow-up clearance may be adjusted. In other words, by simple adjustment of the location in which nuts 66—67 are tightened against the drive pin 64, the clearance 75 may be selectively adjusted.

In the process of making this adjustment, there will necessarily have been a slight change in the compressional loading of spring 70, but once having made the adjustment for follow-up clearance, we provide independent means for selectively controlling the resilient loading on the spring 70, so as to determine starting pressure. In the form shown, the starting-pressure adjustment is made by positioning a nut 76, shown threaded to the connecting member 62—63 and having an inwardly projecting skirt for compressionally driving an angularly spaced plurality of loading pins 77, said pins 77 being guided in member 62—63 for longitudinal displacement and in abutting relation with the spring-loading washer 72 (see FIG. 2). A lock-nut 78 may secure the nut 76 once the adjustment has been made. The loading forces available for various adjustments of nut 76 may be precalibrated and charted, so that in setting up the machine to perform a particular threading operation, the set-up man need only caliper the axial space between nut 76 and a given reference (such as pin 73) on sleeve part 63 in order to be sure of establishing the correct starting pressure.

Figure 4:
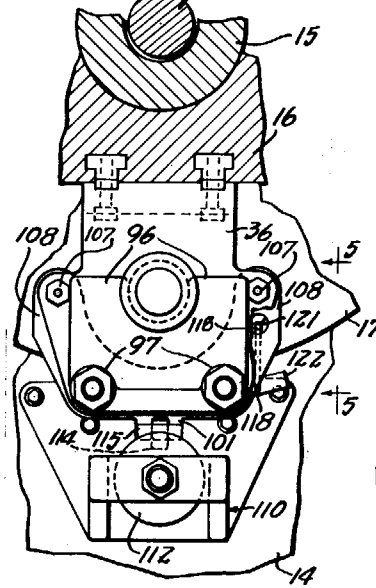
FIG. 4 is a left-hand elevation of the parts shown in FIG. 2.
Figure 5:
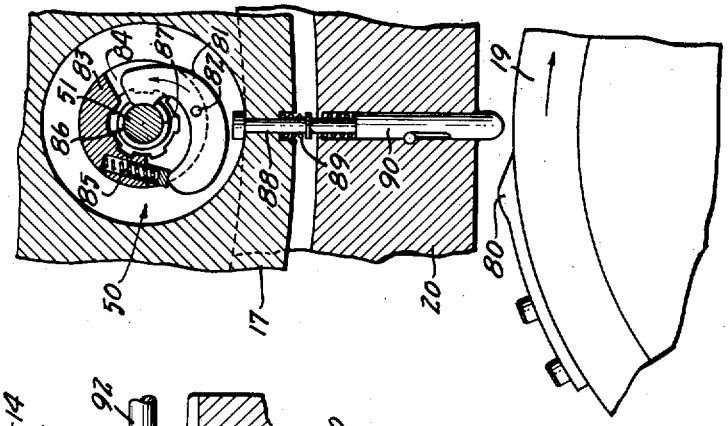
FIG. 5 is an enlarged fragmentary view in the plane 5—5 of FIG. 2.

As indicated generally above, various arrangements of automatic trip devices may be employed to determine threading operations, and the manner of employment of such devices will depend upon the particular type of threading tool or tool holder employed. The arrangement of FIGS. 2, 3 and 4 happens to be shown adapted for reversing-threading operations, whether taps or dies, and the trip mechanism in that case may involve the use of a thread-off or reversing-trip cam 80 carried by the main cam 19, said cam 80 being variously positionable during or substantially at termination of the feed-cam dwell, depending on the needed length of thread on the work piece 13. The reversing-trip action involves the use of the latch previously designated generally at 50 and shown in greater detail in FIG. 5. This latch mechanism may employ an arcuately extending latch member 81 pivotally supported at 82 in the tail end of the drive tube or spindle 47 or in a hub member 83 keyed thereto. The member 83 may be circumferentially [grooved] *notched* at 84 to accommodate the thickness of the latch member 81 and to allow free rocking action thereof in response to the light resilient loading afforded by spring means 85. When in the position shown in FIGS. 2 and 5, the latch member 81 is set so as to ride the reduced end 86 of the clutch shift rod 51, thus intercepting rod 51 against rearward displacement in response to spring 49, by abutment against the shoulder 87 on rod 51.

Since the described latch assembly is carried by the drive spindle 47, it is continuously rotated (in the direction indicated by the arrow in FIG. 5), and tripping may occur whenever a trip pin 88 is sufficiently projected to intercept the tail of latch member 81. The trip pin 88 is carried by the turret drum 17 and is normally urged by spring 89 away from engagement with the latch member 81. Of course, since pin 88 is carried by the turret drum, it will be indexed and only when it is in the working position shown in FIG. 5 will pin 88 align itself with another trip pin 90 slidably carried in the turret crosshead 20.

The pin 90 may be spring-urged to the retracted position and, since it is poised to ride on cam 80, it will be actuated once for every cycle of the main feed cam 19. However, since the trip pin 88 aligns itself with pin 90 only when the threading spindle is in the working station, there is no tripped operation of the latch means 50, except at the working station. By virtue of the placement of cam 80 on cam 19, the latch means 50 is tripped only upon completion of the desired threading, which, as previously indicated, will depend on the kind of thread to be cut and may be substantially at completion of the dwell on cam 19.

Upon tripping the latch means 50, the clutch-shift rod 51 is free to displace rearwardly (with spring-urged snap action, to the right in the [sence] *sense* of FIG. 2), thus connecting the higher-speed drive from gear 45 to the threading spindle 35. This higher speed represents something in excess of the work-rotated speed (spindle 13), and the net result may be to unthread the threading tool from the work. During the reverse or unthreading operation, the excess of threading-spindle speed over the work-spindle speed is preferably such as to effect at least as fast a chaser-driven retraction of the threading tool as the speed of retraction dictated by the drawback slope of the feed cam 19, thereby avoiding damage to the tool.

By the time the turret has become fully retracted, the threading tool will long since have parted company with the work, and we use the occasion to reset the threading-spindle speed to that used for the next threading operation. In the form shown, this is done by means of a fixed abutment member 91 securely anchored to the frame, as by means of an elongated rod 92, lock-nutted at 93 (FIG. 2), to a rearwardly accessible part of the power case 14. The projecting part of the rod 92 is shown grooved at 94 to accommodate a tool, whereby small adjustments may be made in the longitudinal position of the abutment member 91. Finally, on the chance that the latch mechanism 50 may inadvertently have tripped or have failed to reset by the time the threading spindle comes back again to the working station, we prefer that the nose end of the abutment 91 shall be suitably sloped to constitute a cam surface effective on the final stages of indexing into the working position to actuate the projecting end 86 of the clutch shift rod 51 back into the position calling for drive via gear 44, thus enabling latch means 50 to reset and reconditioning the mechanism for a thread-cutting operation.

Figure 6:
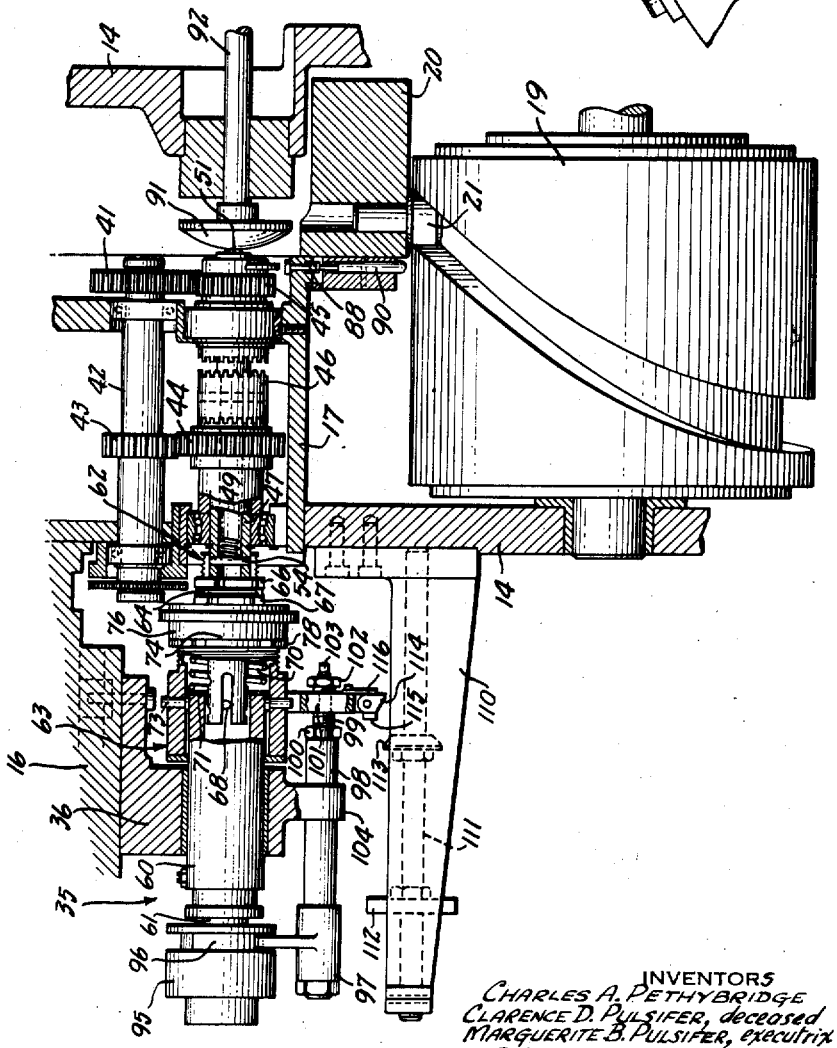
FIG. 6 is a view similar to FIG. 2, but showing connections for operation with a self-opening or collapsing tool, without reversing threading.

As indicated generally above, our mechanism is inherently adaptable also to operation of threading tools of the type in which the cutting elements may be automatically or selectively actuated into and out of cutting engagement with the work. Such tools will not requre reversing of the relative rotation of the tool and work and, therefore, in such cases the thread-off or reversing-trip cam 80 may be removed. This situation is depicted in FIG. 6, and we have shown at 95 a tool of the movable-element type, such as a self-opening die having an axially shiftable actuating sleeve, with a peripheral groove driven by a suitable fork 96. The fork 96 will, of course, have to be of size appropriate to the particular die head used and, therefore, it forms part of a readily removable assembly including mounting bosses 97 (see FIGS. 4, 6). The bosses 97 may be removably secured to actuating rods 98, which are shown internally threaded to accommodate an extension screw 99, so that the effective overall length of the rod 98—99 may be adjustably determined and clamped, as by a lock nut 100.

The tool-tripping mechanism may include a downwardly projecting member or lug 101 to which the rear end of rod 99 is secured, as by a clamp nut 102. We have shown wrench flats 103 at the end of the screw rod 99, so as to permit adjustment of overall length of the trip rod 98—99 in setting up for a particular operation. For proper support of the tripping mechanism, we may rely solely on the sliding engagement, at 104, for the rod 98 in the [turrent] *turret*-mounting bracket or base 36; however, we prefer to employ additional guide means, such as rods 105 (FIG. 3), which may be anchored at 106 to the turret and at 107 to the turret-mounting bracket 36. The trip member 101 may then be formed with outwardly stretched arms 108 (FIG. 4) embracing the threading-spindle assembly and formed with suitable guide bosses 109 (FIG. 3) to ride the guide rods 105.

As frame references to determine die-trip and die-reset operations, we employ a bracket 110 which may be secured to the front face of the power case, as shown in FIGS. 2 and 6, and which may carry an elongated threaded rod 111 along which a trip stop 112 may be selectively positioned and along which a reset abutment 113 may be firmly positioned. The trip abutment 112 is shown projecting more towards the spindle axis than is the reset abutment 113; and in the form shown, this is for the purpose of permitting a latch 114 to ride idly over the abutment 113 during a feeding stroke and yet to permit a rigid abutment 115 on the trip arm 101 to be intercepted only by the trip abutment 112. In the drawback stroke, the latch 114 will have been urged by leaf spring 116 to the position shown in FIG. 6 so as to intercept the flat face of abutment 113; and, since latch 114 is prevented by abutment 115 from clockwise rotation, a firm reference is available for resetting the die when latch 114 is intercepted by abutment 113 during drawback, whereupon the tap or die-reset mechanism, including fork 96, may be actuated to set the cutting tool for another cutting operation.

[In certain set-ups of our mechanism, retraction of the threading spindle may be so fast (as due to high-speed drive of cam 19) that the rearwardly directed momentum of the tool 61 and spindle tube 60 may momentarily substantially compress loading spring 70 when the fully retracted spindle position is reached. This will be after reset nut 113 has reset the cutting element of the die, in readiness for the next cutting operation. However, the reaction due to this transient compression of spring 70 is to suddenly propel the die forward, at times with sufficient vehemence as to release the die just after it has been reset. We provide means for avoiding this difficulty and have shown the details in FIG. 7.]

*In certain set-ups the stroke of the tool turret 16 is relatively long and the die head mounted thereon is relatively large. The die trip assembly, which includes the number 101, the trip rods 98, the fork 96, and its coacting setting sleeve of the die head, is held against axial displacement by the frictional engagement of the setting sleeve with the chaser blocks of the die head in all stations except the working station where axial displacement of the assembly is under the control of the abutment 112 for tripping and 113 for resetting. The return or drawback cycle of the tool turret 16 is always accomplished at high speed, and when relatively large die heads are used the inertia force of the die trip assembly and setting sleeve is sufficient to overcome the friction between the setting sleeve and chaser blocks and snap the die head open when the turret is abruptly stopped at the end of the drawback. Also when loading spring 70 is set for relatively light pressure for cutting fine pitch threads the threading spindle 60 carrying the die head, and the trip assembly will bounce on spring 70 when the tool turret is abruptly stopped, and the recuperation of the spindle and die head is so rapid the trip assembly drags and snaps the die head open. In either case the result is that an open die head is presented to the work in the working station.*

Figure 7:
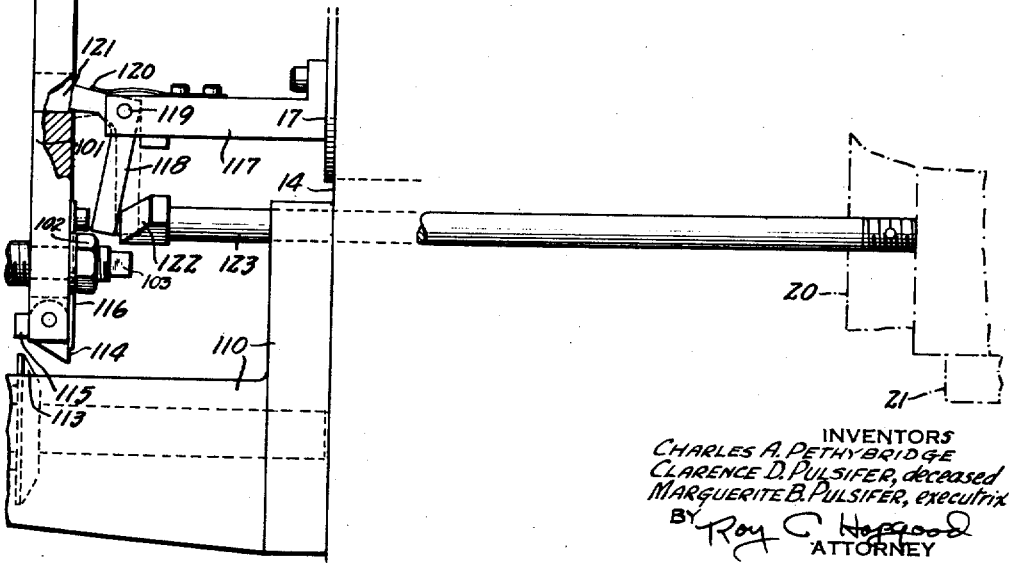
FIG. 7 is an enlarged fragmentary view of safety mechanism utilized in the arrangement of FIG. 6.

The arrangement of FIG. 7 comprises essentially a removable fixed abutment, constituted by the leftward-extending arm of a bell crank 118, pivoted at 119 on a bracket 117 forming part of or secured to the front face of the turret drum. A leaf spring 120 normally urges bell crank 118 to the down-position shown *in dotted lines*, so that it may [arrest] *limit* rearward movement of trip arm 101 (and therefore of the tool and threading spindle) [before] *upon* reaching the fully drawn-back position. Preferably, [bell crank 118] *abutment 113* arrests [arm 101] *the threading spindle and die trip assembly* at a location forward of the fully retracted position, by an amount *equal to the space between pin 68 and the left end of slots 69 plus the required travel of the setting sleeve over the chaser blocks, while the turret which includes sleeve 63 continues to full drawback position thus increasing the tension of springs 74, it being understood that the chaser blocks are collapsed as pin 68 engages the left end of slots 69* [exceeding the maximum adjustment of the follow-up clearance 75. This will mean that the momentum of the tool and spindle 60—61 will be absorbed by bell crank 118 and will not be available to compress spring 70; there will thus be no inadvertent release of the die, once it has been reset by nut 113].

Of course, the described mechanism for avoiding release of the die prohibits the transient compressing of the spring 70 *in all stations except the working station.* As was explained more fully above, the spring 70 furnishes the necessary pressure to start the threading tool in the work piece. To permit the next use of the spring 70 (i.e. for starting pressure) and to prevent the possibility of the threading tool striking the work piece with the threading spindle rigidly located axially by means of the bell crank 118, we utilize means (responsive to the angular relative movement of the turret drum 17 and of the rest of the machine during indexing) to release the stop function of bell crank 118 on arms 101.

In the form shown, an arcuate cam 122 is mounted on a rod 123 slidably guided in the power case 14 and secured to the turret crosshead 20 and therefore continuously maintained in the same axial relationship with the bell crank 118 *in the working station only.* In any station other than the working station the bell crank 118 is maintained (as shown by [solid] *dotted* lines in FIG. 7) to act as an abutment against which trip arm 101 rests, thereby preventing [full maximum] *further* retraction *or bouncing* of the threading spindle [and preventing the compression of] *on* spring 70. Upon indexing into the working position (at which position the threading spindle is located along the same longitudinal axis as the work spindle 12 and work piece 13; see FIG. 1), the lower arm of the bell crank 118 rides the cam 122 and is actuated clockwise to the position shown in [dashed] *full* outline in FIG. 7. In this actuated position, the upper arm of the bell crank 118 is aligned with [an] opening 121 in arm 101, and is therefore [no longer] in position to *enter the opening as the turret continues its forward motion while that of the threading spindle is restricted by the work as previously described* [arrest retraction of the threading spindle. Pin 68 is thus permitted to respond to the urging of springs 74, so that pin 68 may thereafter contact or be supported against spring 70, and the necessary pressure will be available for starting the threading-tool in the work piece].

Upon the completion of the threading operation, and as the turret drum 17 starts to index out of the working position, the bell crank 118 rides off the arcuate cam 122 on rod 123 and returns to the position shown in [solid] *dotted* outline in FIG. 7; this occurs just prior to full retraction of the threading spindle *and die trip assembly which are drawn back in unison by springs 74 when latch 114 disengages the abutment 113 upon index,* so that bell crank 118 may be poised to arrest the rearward movement of trip arm 101 and to assure that the die will remain set. The die will remain set and bell crank 118 will hold the threading spindle *against rearward displacement due to bounce* until [operations at all other indexed stations have been completed] *it is again indexed into the working station.* Then, upon indexing of the turret drum 17 into the threading position, bell crank 118 will again strike arcuate cam 122 on rod 123, and the upper arm of bell crank 118 will align with the hole in trip arm 101, in order to make starting pressure available.

It will be seen that we have disclosed ingenious mechanism for automatically accomplishing threading operations on a turret lathe of the character indicated. The threading operations may be of a wide variety, and no special thread-feed provisions need be made. Furthermore, all threading may be accomplished without increasing the working period for any given working station, that is, without having to arrest the main-cam cycle. Our mechanism is so compactly applicable to the turret lathe that the same machine may be set up for different threading operations at different stations.

While we have described our invention in detail for the preferred form shown, it will be understood that modifications may be made within the scope of the invention as defined in the claims which follow.

We claim:

1. In a machine of the character indicated, frame means, a work-rotating spindle journalled in said frame means and means for continuously driving the same, a tool-supporting turret indexible about a frame-based axis parallel to the axis of said spindle, feed means including a dwell for longitudinally feeding said turret on its axis, indexing means for said turret and operating in timed relation with a cycle of said feed means, a threading spindle bodily carried by said turret at one station thereof and aligned with the axis of said work-rotating spindle when in the working station, for operation on work at said work-rotated spindle, threading-tool means keyed to said threading spindle with axial lost motion, said lost motion being less than the total feed of said feed means but being of at least the extent of total feed of a threading tool beyond the feed limit of said feed means, a compression spring preloaded against stops carried by said threading spindle and interposed between said threading spindle and said threading-tool means, means resiliently urging said threading spindle and threading-tool means into abutment with said spring near that limit of lost motion which represents tool retraction, said threading-tool means being so set on said turret as to engage said threading-tool means with work-supported by said work-rotating spindle prior to attainment of said dwell by a longitudinal amount less than the total lost motion characterizing the engagement of said threading-tool means to said threading spindle, whereby threading once started prior to said dwell may be continued during said dwell, and automatic means including a trip mechanism effective during said dwell for terminating the threading operation.

2. In a machine of the character indicated, frame means, a work-rotating spindle journalled in said frame means and means for continuously driving the same, a tool-supporting turret indexible about a frame-based axis parallel to the axis of said spindle, feed means including a dwell for longitudinally feeding said turret on its axis, indexing means for said turret and operating in timed relation with a cycle of said feed means, a threading spindle bodily carried by said turret at one station thereof and aligned with the axis of said work-rotating spindle when in the working station, for operation on work at said work-rotated spindle, threading-tool means keyed to said threading spindle with axial lost motion, said lost motion being less than the total feed of said feed means but being of at least the extent of total feed of a threading tool beyond the feed limit of said feed means, a compression spring preloaded against stops carried by said threading spindle and interposed between said threading spindle and said threading-tool means, means resiliently urging said threading spindle and threading-tool means into abutment with said spring near that limit of lost motion which represents tool retraction, said threading-tool means being so set on said turret as to engage said threading-tool means with work-supported by said work-rotating spnidle prior to attainment of said dwell by a longitudinal amount less than the total lost motion characterizing the engagement of said threading-tool means to said threading spindle, whereby threading once started prior to said dwell may be continued during said dwell, and automatic means effective while said feed means is substantially at its full-forward position and responsive to attainment of a longitudinal position of said threading-tool means beyond that longitudinal position determined solely by advance of said feed means to said dwell, said automatic means being effective to terminate the threading operation.

3. A machine according to claim 2, in which said threading spindle includes rotary-drive means including a gear fixed to said threading spindle and a longitudinally fixed elongated drive gear meshing therewith for all longitudinal positions of said threading spindle.

4. In a machine of the character indicated, frame means, a work-rotating spindle journalled in said frame means, a turret stem on an axis offset from but parallel to the spindle axis, a turret slidable on said stem and having a plurality of stations successively indexible to working relation with said spindle, feed means including a dwell for said turret, indexing means for said turret and operating in timed relation with a cycle of said feed means, a threading spindle carried by said turret at one station thereof and axially aligned with said work-rotating spindle when in the working station, means for continuously rotating said threading spindle throughout the feed cycle, threading-tool means keyed to said threading spindle with axial lost motion, said lost motion being of at least the extent of total feed of a threading tool beyond the feed limit of said feed means, a preloaded compression spring connecting said threading spindle to said threading-tool means in the feeding direction and only at the start of the tool feed on work, said threading-tool means being so positioned as to commence engagement with work supported by said work-rotating spindle at least just prior to commencement of said dwell, said threading-tool means being of the type in which cutting elements may be selectively positioned in and out of cutting engagement with the work, first tripping means including a frame-based abutment positioned to actuate said cutting elements from cutting to non-cutting relation with the work at a forward threading position forward of the advance produced by said feed means and at a time in the feed cycle substantially at said dwell, and tool resetting means including a frame-based abutment in actuating relation with said elements near the fully drawn-back position of said feed means, whereby said elements will be actuated by said abutments only when said threading spindle is at the working station.

5. In a machine of the character indicated, a work-rotating spindle, a threading spindle aligned with the axis of said work-rotating spindle, means for simultaneously driving both spindles, feed means including a dwell for feeding one of said spindles relatively to the other of said spindles, tool-holding means keyed to said threading spindle with axial lost motion, said lost motion being less than the total feeding of said feeding means but of at least the extent of total feed of a threading tool beyond the feed limit of said feed means, whereby said tool-holding means may move axially relatively to said threading spindle, and yieldable means including a compression spring carried by said threading spindle and preloaded against stops carried by said threading spindle and connecting said threading spindle to said tool-holding means in the feeding direction, means resiliently urging said threading spindle and tool-holding means into abutment with said spring near that limit of lost motion which represents tool retraction relatively to said threading spindle, whereby a resiliently loaded follow-up clearance may be defined at said limit.

6. A machine according to claim 5, and including means for adjustably positioning one of said stops relatively to the other, whereby said spring may be adjustably preloaded.

7. A machine according to claim 5, and including means carried by said threading spindle and independent of the loading of said spring for adjustably positioning said preloaded spring with reference to said limit, whereby said follow-up clearance may be adjusted independently of the thread-starting pressure.

8. In a machine of the character indicated, a work-rotating spindle, a threading spindle rotatable on the axis of said work-rotating spindle, means for feeding said spindles in a feed cycle, said threading spindle including a tool-supporting spindle part and a drive-spindle part keyed to each other with axial lost motion, a collapsible die carried by said tool-supporting part, a trip member in actuating relation with said die, a preloaded compression spring effective axially between said parts near the retracted end of said lost motion, whereby resiliently loaded follow-up clearance is defined near said end, and means resiliently loading said parts toward retracted position, abutment means longitudinally fixed with respect to said trip member and poised to intercept said trip member during tool retraction and prior to full retraction, and means operating in timed relation with said feed means for releasing said abutment means from intercepting relation with said trip member prior to full retraction of said tool-supporting part.

9. A machine according to claim 8, in which said abutment means intercepts said trip member at a location spaced from full retraction by an amount at least as great as the follow-up clearance.

10. In a machine of the character indicated, a frame, a work-rotating spindle, a turret indexible about an axis offset from and parallel to the work-rotating axis, feed means for said turret along the turret axis, turret-indexing means operating in timed relation with a cycle of said feed means, a threading spindle mounted on said turret and aligned with the work-rotating axis when in the working station, said threading spindle including a tool-supporting spindle part and a drive-spindle part keyed to each other with axial lost motion, a collapsible die and including a trip member for resetting the collapsible die carried by said tool-supporting spindle part, a preloaded compression spring effective axially between said parts near the retracted end of said lost motion, whereby a resiliently loaded follow-up clearance is defined near said end, means resiliently loading said parts toward retracted position, abutment means longitudinally fixed with respect to said trip member and poised to intercept said trip member during tool retraction and prior to full retraction, and means operating in timed relation with said indexing means for releasing said abutment means from intercepting relation with said trip member prior to full retraction of said tool-supporting part.

11. A machine according to claim 10, in which said abutment means is carried by said turret.

12. A machine according to claim 11, in which said last-defined means includes a frame-based cam poised to intercept and actuate said abutment means during an indexing operation.

References Cited in the file of this patent or the original patent

UNITED STATES PATENTS

| | | |
|---|---|---|
| 919,271 | Weisz | Apr. 20, 1909 |
| 1,066,035 | Newton | July 1, 1913 |
| 1,131,274 | Rich | Mar. 9, 1915 |
| 1,355,480 | Kylin | Oct. 12, 1920 |
| 1,505,131 | Buschmann | Aug. 19, 1924 |
| 1,805,998 | Schaerer | May 19, 1931 |
| 1,877,056 | Rupple | Sept. 13, 1932 |
| 2,089,930 | Carlson | Aug. 10, 1937 |
| 2,302,353 | Smith | Nov. 17, 1942 |
| 2,321,393 | Kelley | June 8, 1943 |
| 2,327,279 | Mansfield | Aug. 17, 1943 |
| 2,348,364 | Ruppel | May 9, 1944 |
| 2,501,738 | Prutton | Mar. 28, 1950 |
| 2,770,819 | Jobert | Nov. 20, 1956 |